Nov. 17, 1964     C. B. URBAN ETAL     3,157,047
METHOD OF TESTING A TRANSMISSION AND APPARATUS THEREFOR
Filed April 18, 1961     2 Sheets-Sheet 1
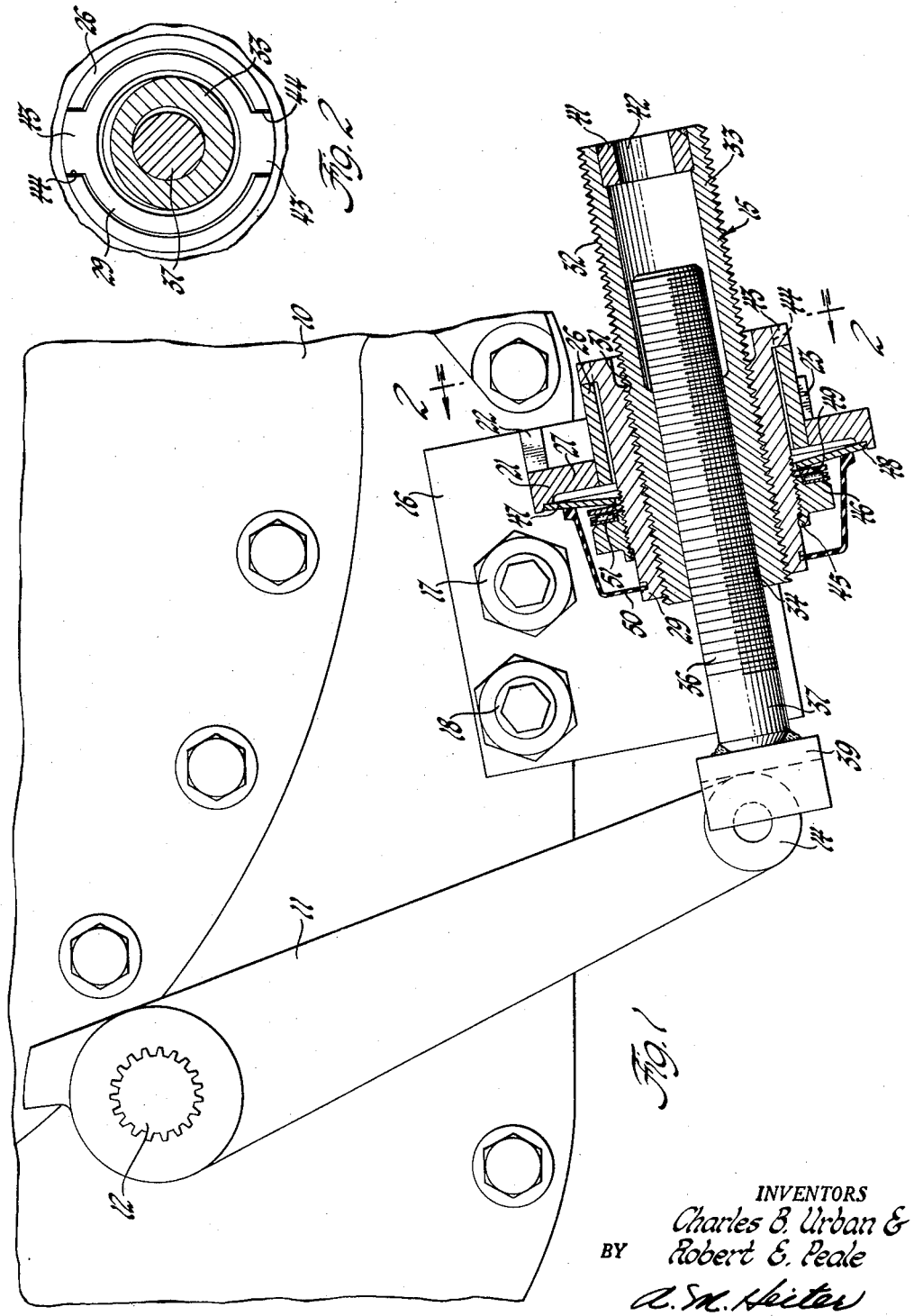
INVENTORS
Charles B. Urban &
BY   Robert E. Peale
ATTORNEY INVENTORS.
Charles B. Urban &
BY Robert E. Peale
A. M. Heiter
ATTORNEY ly limits the force application to the proper value.
3,157,047
METHOD OF TESTING A TRANSMISSION AND APPARATUS THEREFOR Charles B. Urban, Speedway, and Robert E. Peale, Indianapolis, Ind., assignors to General Motors Corporation, Detroit, Mich., a corporation of Delaware
Filed Apr. 18, 1961, Ser. No. 103,758
19 Claims. (Cl. 73—116)

This invention relates to a method and apparatus for testing vehicle drive mechanisms.

Drive mechanisms for power plants and vehicles, and particularly those employing friction engaging devices, to transmit a plurality of drives are generally subjected to a stall test to determine whether the transmission will engage and transmit the full design torque without excessive slip which would cause overheating and wear. A test of this nature is generally made by holding the output of the drive mechanism generally by means of a mechanical fastening device. A stall test is preferably conducted on transmissions of the manually controlled type or automatic type employed in stationary or vehicle applications by applying a predetermined load to the output or vehicle brakes. The brakes should be loaded to the proper degree to stall the engine of the vehicle at the maximum engine output. It is important that torque applying mechanism, employed to actuate the vehicle brakes for the stall test, apply sufficient force to the vehicle brake so that the brakes will hold the full engine torque output. If this is not done, the brakes will slip excessively and thereby be damaged. It is also important that the torque applying mechanism does not apply excessive force to actuate the brake which would break the apply mechanism of the brake or lock the brake, so that it could not slip under excessive momentary load conditions which would be destructive to the drive train during the stall test procedure.

A torque limiting brake apply tool has therefore been devised to apply the vehicle brake with the proper degree of torque. The torque apply tool is cranked to apply torque by means of a screw jack mechanism. When the proper degree of torque has been applied, a spring mechanism operates in response to this torque to indicate that the proper degree of torque has been applied to the vehicle brake mechanism. In a modification a clutch automatically limits the force application to the proper value.

An object of the invention is to provide a method of stall torque testing of an engine, transmission and vehicle brake assembly for a vehicle consisting of the step of attaching a stall torque applying tool to the vehicle, the step of actuating the tool to apply the proper degree of torque to the brake mechanism to stall the vehicle at maximum torque output and the step of operating the vehicle engine and engaging the transmission to test the drive train mechanism at maximum torque output of the engine.

Another object of the invention is to provide for an assembly having an engine, a drive train and output brakes, a brake apply tool which is attached to the vehicle frame and has a torque apply mechanism to engage the vehicle brake mechanism to engage the brakes with a predetermined degree of torque.

Another object of the invention is to provide for an assembly of an engine, a drive mechanism and vehicle brake, a brake applying mechanism mounted on the transmission and having a torque applying mechanism engageable with the vehicle brake applying mechanism and having a jacking mechanism operative in response to the torque being applied by the mechanism to visually indicate a predetermined degree of torque.

Another object of the invention is to provide for an assembly of an engine, a drive mechanism and vehicle brake, a brake applying mechanism mounted on the transmission and having a torque applying mechanism engageable with the vehicle brake applying mechanism and having a jacking mechanism operative in response to the torque being applied by the mechanism to disable the mechanism to prevent further torque application.

Another object of the invention is to provide a torque applying tool, a screw jack mechanism having spring means operative in response to a predetermined degree of torque to disengage a clutch to prohibit further jacking movement.

These and other objects of the invention will be more apparent from the following drawing and description of the preferred embodiments of the invention.

FIGURE 1 shows a partial view of a fluid actuated multiratio transmission and a torque apply tool mounted thereon for applying a brake.

FIGURE 2 is a section of FIGURE 1 on the line 2—2.

FIGURE 3 shows a modified transmission and a torque apply tool installed to actuate the vehicle brake.

Figures 3A, 3B, 5:
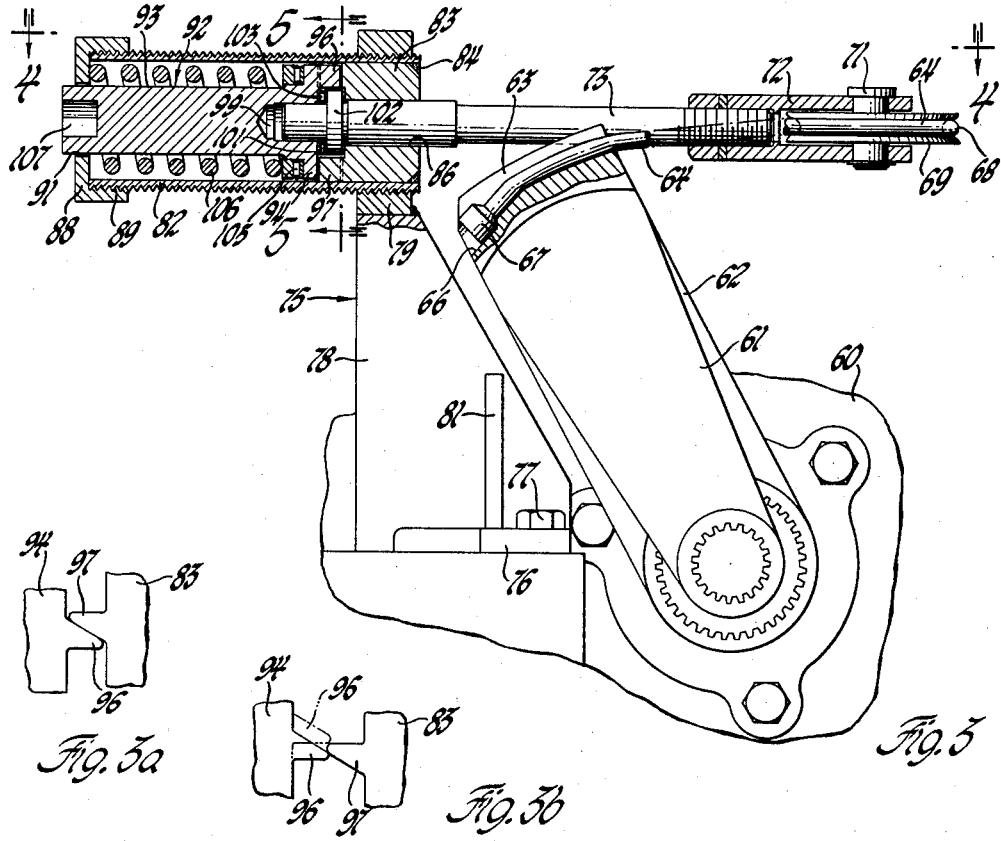
FIGURE 3a shows the clutch teeth in normal position.
FIGURE 3b shows the clutch teeth being disengaged.
FIGURE 5 is a section view of FIGURE 3 on the line 5—5.

The invention is illustrated in conjunction with a drive mechanism, such as a fluid actuated multiratio crossdrive transmission of the type shown, for example, in the Patent 2,689,488, Storer, or 2,912,884, Christenson et al.

The transmission located in housing 10, has a plurality of ratio engaging devices actuated by mechanical or fluid operated means and a vehicle brake operable to engage the output shaft or shafts of the transmission which are connected to the vehicle drive devices. The brake is actuated by a mechanical linkage controlled by a lever 11 connected to shaft 12. The lever 11 has a suitable apertured end 14 normally connected to a brake actuating linkage, such as the linkage 135, shown in FIGURE 6.

The brake apply tool 15 has a support plate 16 suitably apertured to receive the normal transmission housing bolts 17 and 18 to secure the plate 16 to the transmission housing in the proper position to actuate the brake lever to apply the brake. A transverse support plate 21 is secured or welded to the plate 16, and struts 22 and 23 suitably brace the support plate 21. A cylindrical sleeve support and bearing member 26 is secured or welded in an aperture 27 in the support plate 21. A thrust sleeve 29 is rotatably supported inside the support sleeve 26 and has internal right-hand threads 31 cooperating with the external right-hand threads 32 on the actuating sleeve 33. The actuating sleeve has internal left-hand threads 34 cooperating with external left-hand threads 36 on the actuating rod 37. The actuating rod 37 has secured to the operating end, which extends beyond actuating sleeve 33, a channel-shaped member 39 engaging the end 14 of lever 11 to apply brake apply thrust to this lever. The apply sleeve 33 has at the operated end a wall 41 secured thereto having a hexagonal hole 42 to receive the end of a crank (not shown) to rotate the apply sleeve 33 to apply thrust. The thrust sleeve 29 has integral with or fixed thereto at one end a pair of keys 43 which cooperate with a pair of recesses 44 in the support sleeve 26 and which constitute a clutch mechanism operative between the clutch sleeve and the thrust sleeve. A thrust adjusting nut 46 is secured by staking the flange or lock ring at 45 to the other end of the thrust sleeve 29. A Belleville spring 47 bears at its outer edge against a seat 48 on the support plate 21, and at its inner edge 49 engages a needle bearing 51 to transmit thrust without friction drag to the thrust ring 46 and thrust sleeve 29. A rubber boot 50 encloses this mechanism.

Figure 6:
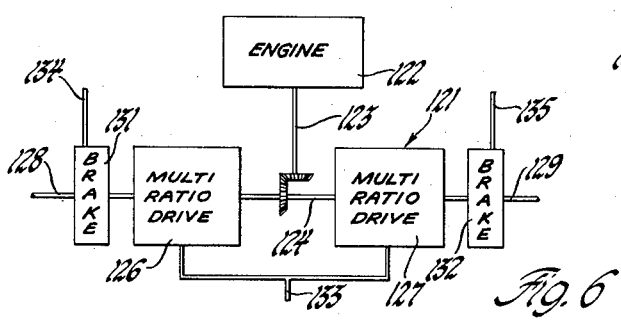
FIGURE 6 is a diagrammatic view of the drive mechanism.
Figure 5:
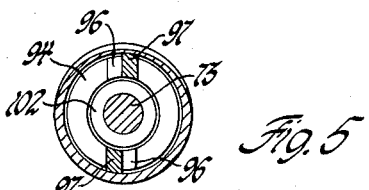

This tool is employed to test an assembly of a transmission 121 and an engine 122 as shown diagrammatically in FIGURE 6. The engine 122 drives through a shaft 123 a cross drive transmission 121 having a housing 10 or 60. The transmission, as shown in the above Patents 2,689,488 or 2,912,884, has right and left drive engaging devices or multiratio drive devices 126 and 127 connected to drive the output shafts 128 and 129 in one or more drive ratios and right and left vehicle brakes 131 and 132 to retard these output shafts. The transmission has a drive or ratio control lever 133 to control both drive units and brake actuating levers 134 and 135 to control brakes 131 and 132. When it is desired to test an engine transmission assemby of this type, the tool is installed on the transmission housing or other suitable support.

It will thus be seen that when a crank is inserted in the hole 42 and the apply sleeve 33 rotated clockwise, the rod 37 will be advanced to apply the brakes. The advance for each revolution will be twice the pitch since apply sleeve 33 rotates relative to both sleeve 29 and rod 37 which are held against rotation and the reaction force will be transmitted by sleeve or reaction member 29 to the support 16. When a predetermined degree of thrust is applied so the reaction force is sufficient to bend the disc or Belleville spring, the preferably constant rate disc spring will then move at the inner edge permitting movement of the entire assembly and particularly sleeve 29 relative to the support sufficient to disengage the clutch mechanism as the keys 43 move out of the recesses permitting rotation of sleeve 29 partially disabling the force apply mechanism and providing a signal to the operator without increasing the force applied to the brakes.

When the brakes are engaged, the drive unit may be engaged at various engine speeds. If the drive units are functioning properly, they will engage the drive and since the output is locked, the engine will stall.

Figure 4:
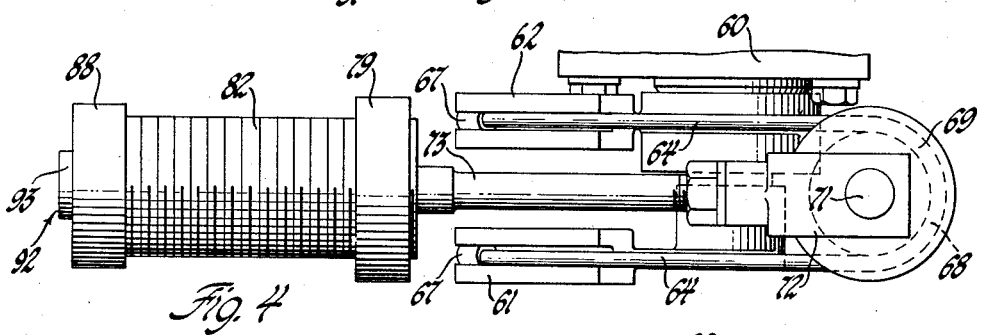
FIGURE 4 is an elevated view of FIGURE 3 on the line 4—4.

The modified brake apply tool, shown in FIGURES 3–5, is illustrated in conjunction with a transmission located in the housing 60 having a drive mechanism generally of the multiratio type and a pair of output shaft brakes controlled by the levers 61 and 62. The outer end of each lever has a groove 63 to receive a brake cable, not shown. The brake cables are removed from the levers and the opposite ends of the test cable 64 are positioned in the grooves in the levers. Each groove 63 has a larger bore-like portion 66 coaxial with and at one end which provides an anchor for the enlarged abutments 67 secured to each end of the cable 64. As best shown in FIGURE 4, the one-piece cable with an abutment 67 fastened at each end secures the ends of the cable to the levers and the center portion or bite 68 bends around a sheave or pulley 69 rotatably mounted on a shaft 71 fixed to a clevis 72. The clevis 72 is secured by suitable means, threads, to the force apply rod 73.

The supporting bracket 75 has a base plate 76 secured by suitable transmission housing bolts 77 to the transmission housing 60 and an upright part 78 supporting an internally threaded ring 79. The support bracket assembly 75, the base 76, the upright member 78, the ring 79 and the transverse braces 81 are secured together, as for example, by welding. The actuator mechanism consists of an externally threaded sleeve 82 threaded into the ring 79. The sleeve 82 has at one end a closure plate 83 located within the sleeve and secured thereto by a peripheral weld 84. The plate 83 has a central aperture 86 to provide a bearing support for the rod 73 permitting rotary axial movement. Sleeve 82 has at the other end a cap closure 88 secured thereto by means of a threaded flange 89 engaging the external threads on the sleeve 82. The cap 88 has a central aperture 91.

An actuator member 92 having a stem 93 and a head portion 94 is located within the sleeve 82. The contacting faces of the head 94 and the internal closure plate 83 have a cooperating dog clutch mechanism consisting of teeth 96 on head 94 and projecting teeth 97 on plate 83. The member 92 has in the head portion a stepped bore 99 having a shoulder 101 to receive the inner end of the rod 73 which has a thrust disc 102 which bears against a bearing 103 abutting shoulder 101 to transfer thrust from the rod 73 to the member 92. The member 92 is normally held in the position shown by the heavy coil spring 106 which abuts at one end against the head 94 and at the other against the closure 88. The stem end of member 92 which projects through the aperture 91 in closure 88 has a hexagonal recess 107 to receive a crank.

Where it is desired to stall test a transmission by applying the vehicle brakes with a force just necessary to stall the vehicle engine at maximum torque, the tool is installed as shown and a crank is inserted in the bore 107 to rotate the drive member 92. This member drives through the clutch elements 96–97 and plate 83 to rotate the sleeve 82. When the assembly, the member 92 and the sleeve 82, is rotated, the external threads on the sleeve 82 and the internal threads on ring 79, advance the assembly. Spring 106 urges the drive member 92 to the position shown and thrust is applied through the spring 106, bearing 105, drive member 92, bearing 103, thrust ring 102 to the rod 73. The rod acts through the forks 72, pin 71, sheave 69 to pull the cable 64 to actuate both levers 61 and 62 to apply both brakes. When the thrust applied to the brakes reaches a predetermined value, the spring 106 is compressed and the clutch elements 96–97 will disengage to disconnect the drive between the drive member 92 and the sleeve to prevent further thrust application. It will be noted that during torque application, the clutch teeth 96–97 are engaged through their sloping sides to transmit torque to rotate the assembly. When the force applied to the brakes and the reaction force reaches a predetermined value, the reaction force is transmitted by drive or reaction member 92 to the spring 106 which is compressed to the degree required to provide the proper predetermined degree of force applied through rod 73, and the torque required to rotate the assembly will, due to the inclined mating teeth surfaces, separate the teeth to permit disengagement of the clutch. In this way, a predetermined thrust is applied to the brake levers 61–62 and the brakes with only this thrust and no additional amount. When the tooth 96 rides over tooth 97 it will snap back as shown by the dotted position of tooth 96 in FIGURE 3b. In this position, vertical tooth surfaces are in contact which do not cause separation of the teeth. Thus it is possible to reversely crank member 92 to release the mechanism.

The above described preferred embodiments are illustrative of the invention which may be modified within the scope of the appended claims.

We claim:

1. In apparatus for applying a predetermined force, a stationary support member, a first member axially movably mounted with respect to said support, a second member axially movably mounted with respect to said first member and said support member, means actuated by said second member to apply a predetermined thrust force in response to rotary movement of said second member, means between a first pair of two of said members operative in response to rotation of said second member to axially advance said second member to apply a thrust force, clutch means operatively connecting a different second pair of said members and operative when engaged to cause relative rotation of said first pair of said members and when disengaged inoperative to cause relative rotation between said first pair of two members, and spring means operatively connected between said second pair of members to transmit the thrust force between said second pair of members and normally operative to engage said clutch and operative in response to a predetermined thrust applied to compress and disengage said clutch to disable said drive means at a predetermined thrust force value.

2. In apparatus for applying a predetermined force, a stationary support member, a first member axially movably mounted with respect to said support, a second member axially movably mounted with respect to said first member and said support member, means actuated by said second member to apply a predetermined thrust force in response to rotary movement of said second member, means between a first pair of two of said members operative in response to rotation of said second member to axially advance said second member with respect to said support member to apply a thrust force, clutch means operatively connecting a different second pair of said members and operative when engaged to cause relative rotation of said first pair of said members and when disengaged inoperative to cause relative rotation between said first pair of two members, and spring means operatively connected between said second pair of members and normally operative to engage said clutch and operative in response to a predetermined thrust applied to compress and disengage said clutch to disable said drive means at a predetermined thrust force value.

3. In apparatus for applying a predetermined force, a stationary support member, a first member axially movably mounted with respect to said support, a second member axially movably mounted with respect to said first member, means actuated by said second member to apply a predetermined thrust force in response to rotary movement of said second member, means between said first and second members operative in response to rotation of said second member to axially advance said second member to apply a thrust force, clutch means operatively connecting said support and first members and operative when engaged to cause relative rotation of said first and second members and when disengaged inoperative to cause relative rotation between said first and second members, and spring means operatively connected between said support and first members and normally operative to engage said clutch and operative in response to a predetermined thrust applied to compress and disengage said clutch to disable said drive means at a predetermined thrust force value.

4. In apparatus for applying a predetermined force, a stationary support member, a first member axially movably mounted with respect to said support, a second member axially movably mounted with respect to said first member, means actuated by said second member to apply a predetermined thrust force in response to rotary movement of said second member, means between said support and first members operative in response to rotation of said second member to axially advance said second member to apply a thrust force, clutch means operatively connecting said first and second members and operative when engaged to cause relative rotation of said support and first members and when disengaged inoperative to cause relative rotation between said support and first members, and spring means operatively connected between said first and second members and normally operative to engage said clutch and operative in response to a predetermined thrust applied to compress and disengage said clutch to disable said drive means at a predetermined thrust force value.

5. In apparatus for applying a predetermined force, a stationary support member, a first member axially movably mounted with respect to said support, a second member axially movably mounted with respect to said first member, means actuated by said second member to apply a predetermined thrust force in response to rotary movement of said second member, thread means between a first pair of two of said members operative in response to rotation of said second member to axially advance said second member to apply a thrust force and to transmit the thrust force between said first pair of members, clutch means operatively connecting a different second pair of said members and operative when engaged to cause relative rotation of said first pair of said members and when disengaged inoperative to cause relative rotation between said first pair of two members, and spring means operatively connected between said second pair of members to transmit the thrust force between said second pair of members and normally operative to engage said clutch and operative in response to a predetermined thrust applied to compress and disengage said clutch to disable said drive means at a predetermined thrust force value.

6. The invention defined in claim 4 and said first pair of members being said first and second members and said second pair of members being said support and first members.

7. The invention defined in claim 5 and said first pair of members being said support and first members and said second pair of members being said first and second members.

8. In apparatus for applying a predetermined load to a brake mechanism of a drive unit including an engine, a drive train and an output brake, a support bracket adapted to be mounted on the drive unit, a thrust sleeve axially movably mounted and non-rotatably mounted on said support, means to apply a thrust applying force to the brakes including a thrust apply rod, said thrust apply rod having external threads of one hand and said thrust sleeve having internal threads of the opposite hand, a drive sleeve having internal threads mating with the external threads of said thrust apply rod and external threads mating with the internal threads of said thrust sleeve to provide on rotation of said drive sleeve an advance of said thrust apply rod equal to the sum of the leads of both threads for each revolution, and spring means located between said thrust sleeve and said support permitting said thrust sleeve to move a predetermined distance to visually indicate when said predetermined thrust is applied to said brake means.

9. In test apparatus for applying a predetermined degree of torque to the brakes of a vehicle drive train mechanism including a transmission having a housing, friction engaging drive means and a brake, a support member adapted to be attached to the transmission housing having an annular internally threaded ring, an externally threaded thrust sleeve threaded into said internally threaded ring, a closure having an aperture for both the front and rear end of said sleeve, thrust means connected to said brakes to apply said brakes including a rod supported for axial movement in said aperture of said front closure, a drive member rotatably mounted within said sleeve having a portion accessible through said aperture in said rear closure to apply a manual rotative force to said drive member, cooperating clutch means on said drive member and front closure, spring means abutting said rear closure and said drive member to bias said clutch means into engaged position, said thrust means engaging said drive member in thrust transmitting relationship to transmit the spring biasing force to the brake to apply the brake and the reaction of the brake apply force operative on said driving member to urge said driving member in a clutch disengaging direction to disengage said clutch means when a predetermined force has been applied to said brake.

10. In test apparatus for applying a predetermined degree of torque to the brakes of a vehicle drive train mechanism including a transmission having a housing, friction engaging drive means and a brake, a support member adapted to be attached to the transmission having an annular internally threaded ring, an externally threaded thrust sleeve means threaded into said internally threaded ring, thrust means connected to said brakes to apply said brakes mounted on said thrust sleeve means for relative movement, a drive member rotatably mounted within said sleeve having a portion accessible to apply a rotative force to said drive member, cooperating clutch means on said drive member and thrust sleeve means, spring means abutting thrust sleeve means and said drive member to bias said clutch means into engaged position, said thrust means engaging said drive member in thrust transmitting relationship to transmit the spring biasing force to said thrust means and to the brake to apply the brake and with the reaction of the brake apply force operative on said driving member to urge said driving member in a clutch disengaging direction to disengage said clutch means when a predetermined force has been applied to said brake.

11. In apparatus for applying a predetermined force to a device, a support having means for holding the support stationary with respect to the device, a reaction member movably mounted on said support, means mounted on said reaction member for movement with respect to the reaction member operative on movement to apply a predetermined apply force to the object creating a predetermined reaction force, and a spring operatively engaging said support and said reaction member to transmit said predetermined reaction force from said reaction member to said support having a substantially constant rate permitting movement of said reaction member without increasing the force transmitted above said predetermined reaction force to indicate that a predetermined force is being applied.

12. In apparatus for applying a predetermined force to a device, a support having means for holding the support stationary with respect to the device, a reaction member movably mounted on said support, force apply means mounted on said reaction member for movement with respect to the reaction member operative on movement to apply a predetermined apply force to the device creating a predetermined reaction force, a disc spring operatively engaging said support and said reaction member to transmit said predetermined reaction force from said reaction member to said support having a constant rate permitting movement of said reaction member without increasing the force transmitted above said predetermined reaction force, and said reaction member including means operative in response to a said predetermined reaction force to move said reaction member to at least partially disable said force apply means.

13. A method of stall testing a drive assembly usable together as a product including an engine and a transmission having a housing, a friction engageable drive mechanism and a vehicle friction brake with a brake apply member, the step of attaching a torque apply tool to the transmission housing and connecting the torque apply tool to the brake apply member, the step of actuating the torque apply tool to apply a predetermined torque to the vehicle brake to apply the vehicle brake to the proper degree to absorb sufficient torque to stall the engine at the maximum design torque input with the drive mechanism engaged but insufficient to absorb additional torque, and the step of operating the engine at a plurality of speeds and operating the transmission to engage the drive at said speeds and testing the operation of the engine and transmission.

14. A method of stall testing a drive assembly usable together as a product including an engine and a transmission having a housing, a friction engageable drive mechanism and a vehicle friction brake having an apply member, the step of removing a transmission housing bolt, the step of attaching a torque apply tool to the transmission housing by means of bolts placed in the transmission housing bolt holes and connecting the torque apply tool to the brake apply member, the step of actuating the torque apply tool to apply torque to the vehicle friction brake until a visual signal indicates that a predetermined torque has been applied to the vehicle brake sufficient to stall the engine at the maximum design torque input with the drive mechanism engaged but insufficient to absorb additional torque and operating the engine and operating the transmission to engage the drive and testing the operation of the engine and transmission.

15. A method of stall testing a drive assembly usable together as a product including an engine and a transmission having a housing, a friction engageable drive mechanism and a vehicle friction brake with an apply member, the step of attaching a torque apply tool to the transmission housing having torque apply means and torque applying means connected by a clutch disengaged in response to a predetermined torque applied by said torque applying means, the step of connecting said torque applying means to said apply member of said vehicle friction brake to apply said vehicle friction brake, the step of actuating the torque apply tool by actuating said torque apply means to apply a predetermined torque to said torque applying means for transmission to said vehicle brake sufficient to stall the engine at the maximum design torque input with the drive mechanism engaged but insufficient to absorb additional torque, and the step of operating the engine at a plurality of speeds and operating the transmission to engage the drive at each of said plurality of speeds and testing the operation of the engine and transmission.

16. In apparatus for applying a predetermined load to a brake mechanism of a drive unit including an engine, a drive train and an output brake, a support bracket adapted to be mounted on the drive unit, a thrust sleeve axially movably mounted on said support, means operatively connected between said thrust sleeve and said support to prevent relative rotation between said thrust sleeve and said support, means to apply a thrust applying force to the brakes including a thrust apply rod, said thrust apply rod having external threads of one hand and said thrust sleeve having internal threads of the opposite hand, a drive sleeve having internal threads mating with the external threads of said thrust apply rod and external threads mating with the internal threads of said thrust sleeve provide on rotation of said drive means an advance of said thrust apply rod equal to the sum of the leads of both threads for each revolution, spring means located between said thrust sleeve and said support permitting said thrust sleeve to move a predetermined distance to visually indicate when said predetermined thrust is applied to said brake means.

17. In apparatus for applying a predetermined force to a movable element; the combination of a fixed support; a thrust member having connecting means located externally adapted to engage a movable element; actuator means connecting said thrust member to said support including motion means for moving said thrust member relative to said support, means connected to said motion means to supply an input force to actuate said motion means and spring means transmissing the reaction force due to movement of said thrust member exerting a force against a movable element operative in response to said thrust member exerting a predetermined force against said movable element disabling said motion means to prevent operation of said motion means to move said thrust member relative to said support.

18. In apparatus for applying a predetermined force to a movable element; the combination of a fixed support; a thrust member having connecting means located externally adapted to engage a movable element; actuator means connecting said thrust member to said support including motion means for moving said thrust member axially relative to said support, means connected to said motion means to supply a rotary input force to actuate said motion means and spring means axially transmitting the reaction force due to movement of said thrust member exerting a force against a movable element operative in response to said thrust member exerting a predetermined force against said movable element disabling said motion means to prevent operation of said motion means to move said thrust member relative to said support.

19. In apparatus for applying a predetermined force to apply a vehicle brake in a drive unit including an engine, transmission and vehicle brake; the combination of a fixed support; a thrust member having connecting means located externally adapted to apply a vehicle brake; actuator means connecting said thrust member to said support including motion means for moving said thrust member relative to said support, means connected to said motion means to supply an input force to actuate said motion means and spring means transmitting the reaction force due to movement of said thrust member exerting a force to apply a vehicle brake operative in response to said thrust member exerting a predetermined force to apply a vehicle brake disabling said motion means to prevent operation of said motion means to move said thrust member relative to said support.

References Cited in the file of this patent

UNITED STATES PATENTS

| | | | |
|---|---|---|---|
| 1,044,121 | Beall | | Nov. 12, 1912 |
| 1,107,619 | Kuhner | | Aug. 18, 1914 |
| 1,513,430 | Scott | | Oct. 28, 1924 |
| 1,877,367 | Seppmann | | Sept. 13, 1932 |
| 2,554,969 | Williams | | May 29, 1951 |
| 2,587,712 | Dodge | | Mar. 4, 1952 |
| 2,745,303 | Cornelius | | May 15, 1956 |
| 2,887,921 | Livermont | | May 26, 1959 |
| 2,973,848 | Dixon | | Mar. 7, 1961 |